United States Patent [19]
Aoki et al.

[11] Patent Number: 5,229,754
[45] Date of Patent: Jul. 20, 1993

[54] AUTOMOTIVE REFLECTION TYPE DISPLAY APPARATUS

[75] Inventors: Kunimitsu Aoki; Yoshiyuki Furuya, both of Susono, Japan

[73] Assignee: Yazaki Corporation, Tokyo, Japan

[21] Appl. No.: 653,331

[22] Filed: Feb. 11, 1991

[30] Foreign Application Priority Data

Feb. 13, 1990 [JP] Japan ............................ 2-11929[U]

[51] Int. Cl.$^5$ ............................................. G09G 3/02
[52] U.S. Cl. .................................... 340/705; 359/631; 359/833
[58] Field of Search .................. 340/705, 815.07, 980; 353/438, 631, 633, 630, 638, 33, 11, 12; 358/104; 359/640, 831, 833

[56] References Cited

U.S. PATENT DOCUMENTS

| | | | |
|---|---|---|---|
| 1,762,933 | 6/1930 | Mihalyi | 353/38 |
| 2,686,455 | 8/1954 | Porsche | 353/14 |
| 3,302,515 | 2/1967 | Knus | 353/48 |
| 3,848,974 | 11/1974 | Hosking et al. | 340/705 |
| 3,892,474 | 7/1975 | Nilsson | 356/252 |
| 3,976,368 | 8/1976 | McCann et al. | 359/834 |
| 3,984,157 | 10/1976 | LeVantine | 351/213 |
| 4,114,997 | 9/1978 | Lunetta | 353/11 |
| 4,436,371 | 3/1984 | Wood et al. | 359/606 |
| 4,611,877 | 9/1986 | Ellis | 340/705 |
| 4,636,782 | 1/1987 | Nakamura et al. | 340/705 |
| 4,697,881 | 10/1987 | Brown | 359/613 |
| 4,726,662 | 2/1988 | Cromack | 359/40 |
| 4,729,634 | 3/1988 | Raber | 359/630 |
| 4,971,436 | 11/1990 | Aoki et al. | 353/31 |
| 4,973,139 | 11/1990 | Weinhrauch et al. | 340/705 |
| 4,973,942 | 11/1990 | Iino | 340/438 |
| 4,986,631 | 1/1991 | Aoki et al. | 359/438 |
| 4,991,537 | 2/1991 | Maramatsu | 116/286 |

FOREIGN PATENT DOCUMENTS

| | | |
|---|---|---|
| 1944211 | 10/1973 | Fed. Rep. of Germany . |
| 3225362 | 7/1982 | Fed. Rep. of Germany . |
| 859823 | 12/1940 | France . |
| 52-41545 | 3/1977 | Japan . |
| 52-57633 | 5/1977 | Japan . |
| 60-191847 | 9/1985 | Japan . |
| 61-12450 | 1/1986 | Japan . |
| 0028076 | 1/1990 | Japan ................................ 340/705 |
| 2-193735 | 7/1990 | Japan . |
| 2-193736 | 7/1990 | Japan . |
| 2-193737 | 7/1990 | Japan . |
| 2-216336 | 8/1990 | Japan . |
| PCT89/02611 | 3/1989 | PCT Int'l Appl. . |
| 2240855 | 8/1991 | United Kingdom . |

Primary Examiner—Tommy Chin
Assistant Examiner—Jick Chin
Attorney, Agent, or Firm—Nikaido, Marmelstein, Murray & Oram

[57] ABSTRACT

The prism reflector installed immediately above an indicator's display surface consists of a prism and a flange portion that is flush with one surface of the prism and which extends from the periphery of that surface. The surface of the prism and the flange portion form a reflecting surface. A reflector plate is arranged to face the reflecting surface of the prism reflector and has a concave surface, whose light axis is inclined with respect to the reflecting surface of the prism reflector toward the thicker side of the prism. Light from the indicator's display enters the prism, is refracted as it leaves the reflecting surface, and travels toward the reflector plate's concave surface, which reflects the incident light back toward the reflecting surface of the prism reflector, which then reflects it toward the driver's viewing point. Because the light travels back and forth between the reflecting surface and the reflector plate, a long light path is obtained for effective remote display while keeping the apparatus compact. The reflector plate's concave surface enlarges the indicator display image, so that a large virtual image can be formed at a remote location from the driver.

4 Claims, 5 Drawing Sheets

AUTOMOTIVE REFLECTION TYPE DISPLAY APPARATUS

BACKGROUND OF THE INVENTION

1. Field of the Invention

The present invention relates to an automotive reflection type display apparatus that displays to a driver vehicle running information at the instrument panel of a vehicle.

2. Prior Art

There has been an automotive display apparatus which utilizes a reflecting surface to form a display image at a distant location from the driver to enable quick recognition by the driver of the displayed information.

FIGS. 9 and 10 show examples of such a conventional display apparatus. In the apparatus of FIG. 9, an indicator 43 such as a liquid crystal display and a fluorescent display tube is attached to the underside of a meter hood 42 over an instrument panel 41. A half-mirror 44 is installed at the meter display portion of the instrument panel 41 to project the light from the indicator 43 onto the half-mirror 44 and thereby form a virtual image 45 of the indicator 43.

The virtual image 45 is located as far behind the half-mirror 44 as a distance between the half-mirror 44 and the indicator 43, producing a remote display effect.

In the apparatus of FIG. 10, a reflector plate 56 facing the half-mirror 54 is installed in a meter hood 52 of the instrument panel 51. The meter hood 52 also contains an indicator 53 at a position opposite to the reflector plate 56, which reflects the light from the indicator 53 onto the half-mirror 54 to form a virtual image 55 of the indicator 53.

This construction elongates the light path from the indicator 53 to the half-mirror 54, providing a greater effect of the remote display than that obtained with the apparatus of FIG. 9.

Denoted 47 in FIG. 9 and 57 in FIG. 10 are other indicators seen superimposed with the virtual images 45.

With the apparatus of FIG. 9 in which the rays of light are reflected only once by the half-mirror, however, a sufficient effect of the remote display cannot be produced. When the number of reflections is increased to elongate the light path as in the device of FIG. 10, the volume occupied by the light path increases, which leads to an increase in the overall size of the apparatus.

In these remote display apparatuses, it is necessary to increase a view angle of the virtual image to prevent the recognizability or visibility of the remotely formed image from deteriorating. It is also required that the viewing area on the reflection surface of the half-mirror be made large enough to accommodate the entire virtual image, so that a part of the image will not overflow from the viewing area to get lost.

SUMMARY OF THE INVENTION

The present invention has been accomplished to overcome the above drawbacks and its objective is to provide a compact automotive display apparatus that utilizes a reflecting surface to form a remote display and which has an increased distance to the remote display and also provides an enlarged view angle of a virtual display image and an increased view area on the reflection surface.

To achieve the above objective, the automotive reflection type display apparatus according to this invention comprises: a reflecting member forming a reflecting surface, said reflecting member consisting of a prism and a flat plate-like flange portion which is flush with a first surface of two major surfaces of the prism adjoining at an acute angle and which extends from the circumference of the first surface; an indicator so disposed as to have its display surface face a second surface of the prism of the reflecting member that adjoin the first surface at an acute angle; and a reflector plate having a reflecting concave surface that opposes the reflecting surface of the reflecting member, said reflector plate being disposed in such a way that a light axis of the reflecting concave surface extending toward the reflecting surface of the reflecting member is inclined toward a thicker side of the prism and that the display surface of the indicator is located within a focal point of the concave surface; whereby the reflecting member, the indicator and the reflector plate are arranged so that the light axis of the concave surface of the reflector plate extends optically through the reflecting surface of the reflecting member toward a driver's seat, rays of light from a display of the indicator are transmitted through the prism of the reflecting member, reflected by the concave surface of the reflector plate back toward the reflecting surface of the reflecting member and then further reflected by the reflecting surface toward the driver's seat so that an image of the indicator display can be seen through and within the reflecting surface from the driver's seat side.

In the automotive reflection type display apparatus according to this invention, light from the indicator's display is transmitted through the prism of the reflecting member toward the reflector plate. The light is then reflected by the concave surface of the reflector plate back toward the reflecting surface of the reflecting member, which then reflects it toward the driver's seat.

The light path from the indicator through the prism to the concave surface of the reflector plate is almost coaxial with the light path from the concave surface to the reflecting surface of the prism. So, the same space is effectively utilized to obtain a long light path, thereby forming a remote display image behind the reflecting surface. The virtual image seen by the driver is enlarged by the concave surface. Since the provision of the flange portion makes the reflecting surface of the reflecting member larger in area than the display surface of the indicator facing the second surface of the prism, a sufficiently large viewing area can be obtained on the reflecting surface.

PREFERRED EMBODIMENTS OF THE INVENTION

Figure 2:
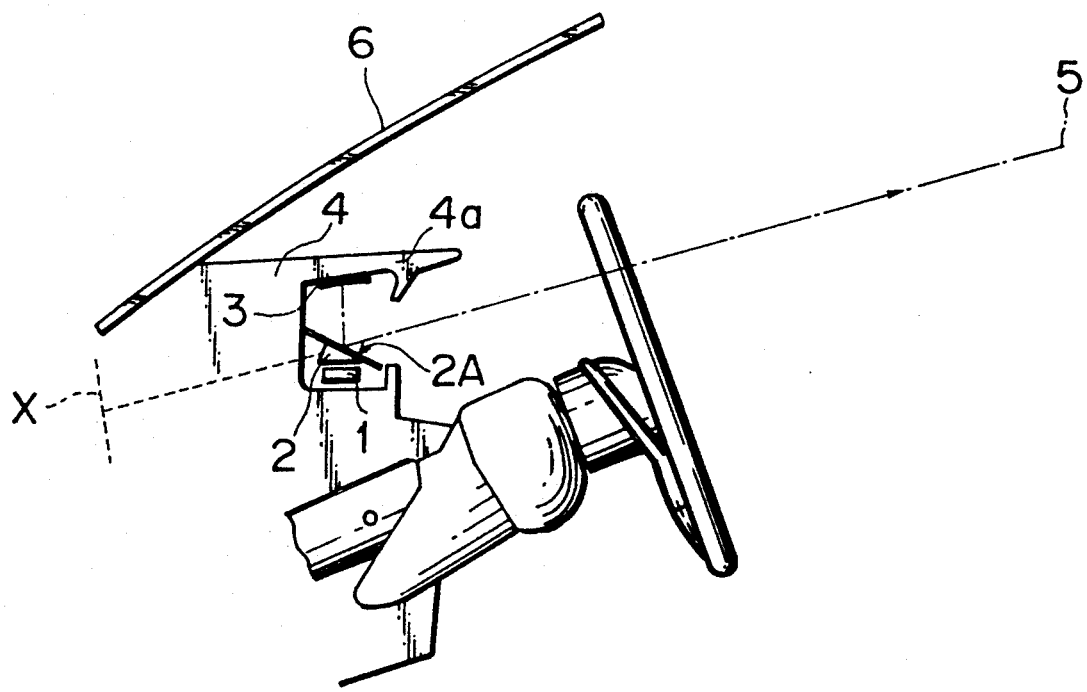
FIG. 2 is a schematic diagram showing the automotive reflection type display apparatus of FIG. 1 mounted in a dashboard.

FIG. 2 shows an automotive reflection type display apparatus of this invention mounted in the dashboard of an automobile.

In the figure, denoted 1 is an indicator such as a fluorescent indicator tube, 2 a prism reflector as a reflecting member detailed later, consisting of a prism and a flat plate formed as one piece, add 3 is a reflector plate having a concave surface. The indicator 1, the prism reflector 2, and the reflector plate 3 make up the display apparatus of the embodiment, which is installed in an instrument panel 4. Designated 5 is a viewing point of a driver and 6 a windshield.

The indicator 1 is installed in the instrument panel 4 with its display surface directed upward. The prism reflector 2 is arranged above the display surface of the indicator 1. The reflector plate 3 is installed in a meter hood 4a at the top of the instrument panel 4.

As detailed later, the light of display of the indicator 1 passes through the prism reflector 2 and is reflected by the reflector plate 3 and then further reflected by a reflecting surface 2A of the prism reflector 2. When the reflecting surface 2A of the prism reflector 2 is seen from near the viewing point 5, a virtual image X is formed at a position behind the prism reflector 2 (toward the front of the vehicle).

Figure 3A:
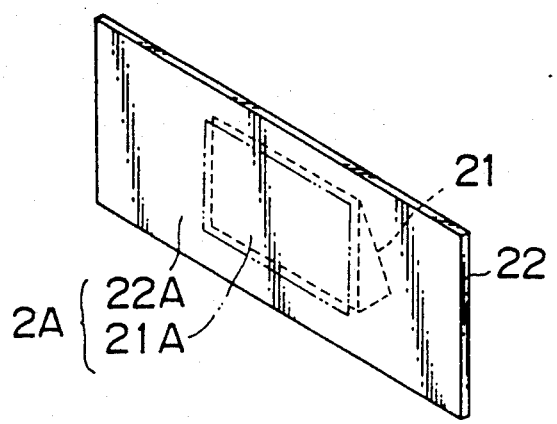
FIGS. 3a and 3b are perspective views of a prism reflector of the embodiment.
Figure 3B:
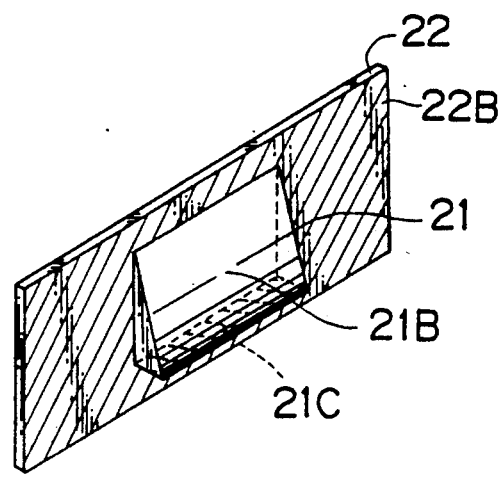
Figure 4A:
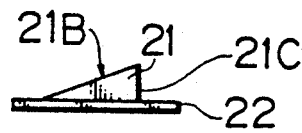
FIGS. 4a, 4b and 4c are front, top and side views of the prism reflector of the embodiment.
Figure 4B:
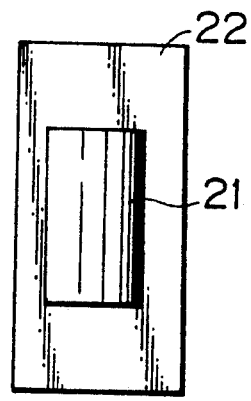
Figure 4C:
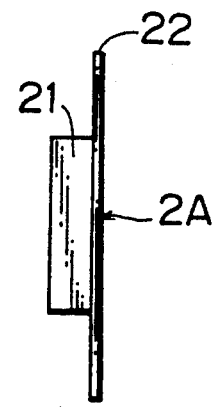

FIGS. 3a and 3b are perspective views of the prism reflector 2 and FIG. 4 shows the front, top and side views of the prism reflector 2.

The prism reflector 2 is made of a transparent resin and consists of a wedge-shaped prism 21 and a flat plate-like flange portion 22 formed in one piece. A first surface 21A of the prism 21—one of two major flat surfaces adjoining at an angle—and the front surface 22A of the flange portion 22 (a surface from which the prism 21 does not project) are flush with each other to form the reflecting surface 2A. The reflecting surface 2A is larger in area than a second surface 21B of the prism 21.

The prism 21 is made smaller than the prism reflector 2 itself, and the display surface of the indicator 1 has an area almost equal to that of the second surface 21B of the prism 21.

As shown shaded in FIG. 3b, a third surface 21C of the prism 21 and a back surface 22B of the flange portion 22 are applied with a black coating.

Figure 1:
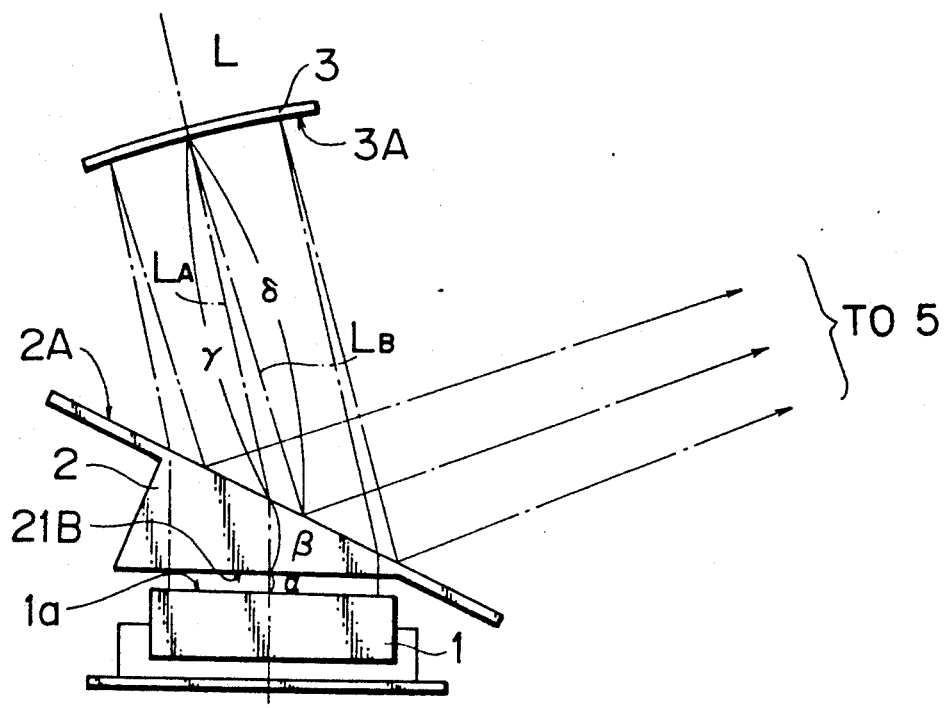
FIG. 1 is a schematic diagram showing an automotive reflection type display apparatus as one embodiment of this invention.

FIG. 1 is a schematic diagram showing the automotive reflection type display apparatus of the embodiment, in which the indicator 1 is disposed in such a way that its display surface 1a faces the second surface 21B of the prism reflector 2. The reflector plate 3 is disposed in such a manner that a light axis L of the concave surface 3A is inclined relative to the reflection surface 2A of the prism reflector 2 and that the display surface 1a of the indicator 1 is within a focal point of the concave surface 3A.

One-dot lines in the figure represent the rays of light coming from the indicator 1 toward the viewing point 5. The light projected from the display of the indicator 1 enters the prism 21 perpendicular to the second surface 21B. The incident light of the display is refracted as indicated by a light axis $L_A$ as it passes through the reflecting surface 2A of the prism reflector 2 and then strikes almost perpendicularly the reflector plate 3.

The reflector plate 3 reflects the incident light, slightly deflecting the light axis from $L_A$ to $L_B$. The reflected light is further reflected by the reflecting surface 2A toward the viewing point 5.

The light axis $L_A$ and the light axis $L_B$ may be coaxial or two separate axes close to each other. In either case, since the light axes $L_A$ and $L_B$ are very close together, the light reciprocates between the reflecting surface 2A and the concave surface 3A of the reflector plate 3. Hence, the distance of the light path between the two reflecting surfaces is approximately two times the distance between the reflecting surface 2A and the concave surface 3A, thus elongating the light path while reducing the space occupied by the light path, which in turn makes the overall apparatus size small. The virtual image seen from the viewing point 5 is located within the range where it can be seen through the reflecting surface 2A. The distance from the reflecting surface 2A to the virtual image is longer than the sum of distances between the respective members $$\alpha + \beta + \gamma + \delta$$

by as much as is elongated by the enlarging action of the reflector plate 3.

Next, we will describe the action of the prism reflector 2.

Figure 5:
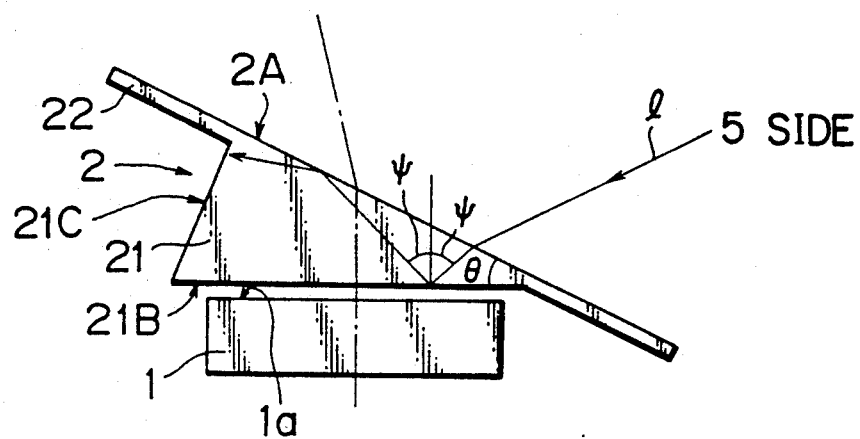
FIG. 5 is a schematic view showing the action of the prism reflector of the embodiment.

FIG. 5 is a schematic view showing the action of the prism reflector 2, in which an imaginary light l is shown transmitted from the viewing point 5 toward the prism reflector 2. The locus of the imaginary light l can be considered optically as a line of sight from the viewing point 5.

An angle $\theta$ (prism angle $\theta$) between the reflecting surface 2A and the second surface 21B of the prism 21 is so set that the light ray l incident on the reflecting surface 2A is refracted in the prism 21 and then totally reflected by the inside of the second surface 21B of the prism 21. That is, an angle 104 in the figure is set larger than the critical angle of the total reflection at the second surface 21B. It is noted that if the light ray is reflected 100 percent by the second surface 21B of the prism 21, it is also totally reflected by the reflecting surface 2A as shown.

Therefore, when a driver looks from the direction of light ray l (from the viewing point 5) at the reflecting surface 2A, he or she cannot directly see the outside of the second surface 21B of the prism 21, i.e., the display surface 1a of the indicator 1, through the prism 21.

Since the indicator 1 is prevented from being seen through the prism reflector 2 by the total reflection, the prism reflector 2 and the indicator 1 can be put close together, which in turn makes it possible to increase the distance between the prism reflector 2 and the reflector plate 3, thus elongating the distance to the remote display.

When a driver looks from the direction of light ray l at the reflecting surface 2A, the third surface 21C is seen through the reflecting surface 2A and the second surface 21B of the prism 21. However, the back of the third surface 21C and of the flange portion 22 is applied with dark coating, as mentioned before, so that the driver recognizes it only as a dark background. As a result, the display image of the indicator 1 is formed at a remote location against this dark background, enhancing the contrast of the display.

Since, as explained about the light ray 1 and the total reflection in the prism 21 in FIG. 5, the light coming from the driver side and entering through the reflection surface 2A into the prism 21 does not pass through the second surface 21B onto the indicator 1, the display is prevented from being washed out or faded out by external incident rays.

Figure 6:
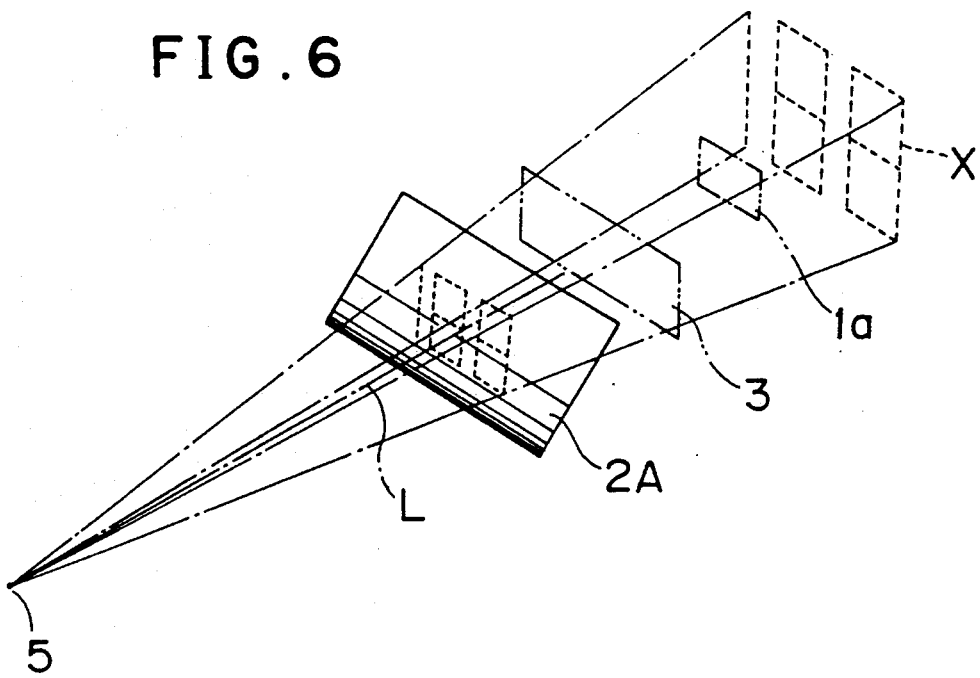
FIG. 6 is a schematic view showing one example of how the display image formed by the embodiment is seen.

FIG. 6 shows one example of how the display is seen in the embodiment. In the figure, the viewing point 5, the reflecting surface 2A, the reflector plate 3, the display surface 1a of the indicator 1 and the virtual image X are shown arranged on an optical straight line.

The display surface 1a is smaller than the reflecting surface 2A and is optically located the light path length behind the reflecting surface 2A, so that an image of the display surface 1a that will be formed by a plane surface reflection alone will have a small viewing angle. The virtual image X, however is enlarged by the reflector plate 3 and thus its viewing angle becomes large, making the image easy to recognize.

Further, since the viewing angle of the virtual image X is set smaller than that of the reflecting surface 2A, the virtual image X is prevented from flowing out of the reflecting surface 2A even when the viewing point 5 deviates from the light axis L vertically or laterally to some extent. In this way, an increased viewing area is obtained.

The curvature of the concave surface of the reflector plate 3 may be changed to increase the magnification. This makes it possible to reduce the size of the indicator 1 and therefore the overall size of the display apparatus.

Figure 7A:
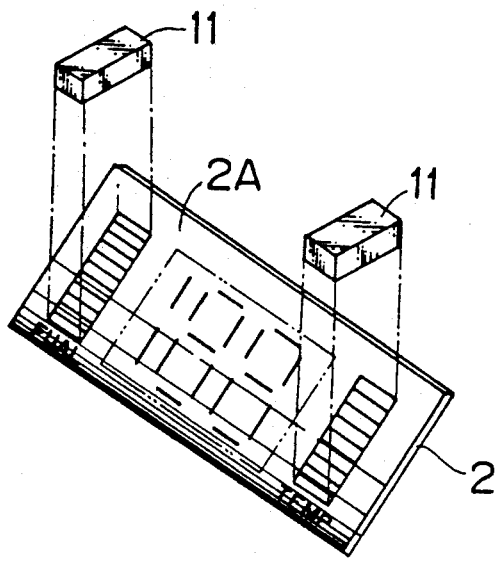
FIGS. 7a and 7b are a schematic view of another embodiment of this invention in which multiple displays are superimposed.
Figure 7B:
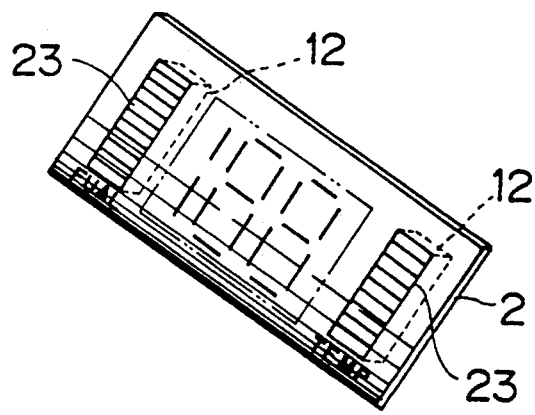

Since there is some margin on the reflecting surface 2A around the display image or virtual image X when that image is seen through the reflecting surface 2A, other indicators 11 may be provided close to the reflector plate 3 as shown in FIG. 7a to reflect the display image of the indicators 11 by the reflecting surface 2A to form a combined display. As shown in FIG. 7b, the reflecting surface 2A may be formed with openings 23 at desired locations through which other indicators 12 are shown, thus providing a combined display with the virtual image.

When a combined display is made using the marginal area on the reflecting surface 2A surrounding the virtual image, the positions of additional indicators or the locations of openings on the reflecting surface should be taken into account to have a sufficient view area on the reflecting surface.

While the prism reflector 2 of the embodiment has the flange portion 22 around the entire circumference of the prism 21, the flange portion 22 need not be formed around the entire circumference.

Figure 8:
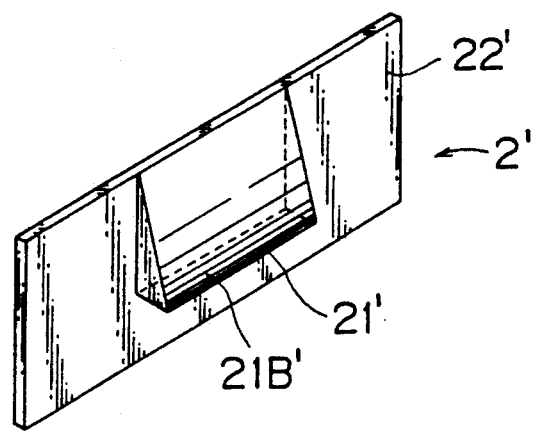
FIG. 8 is a perspective view of another example of a prism reflector.
Figure 9:
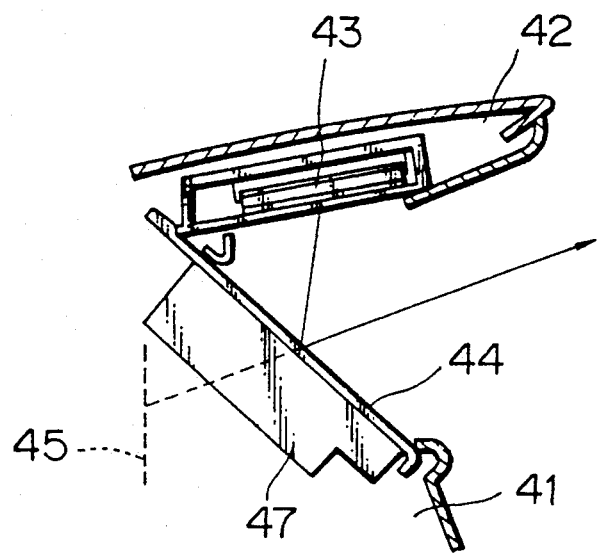
FIGS. 9 and 10 are schematic cross sectional views of conventional display apparatuses using the reflection surface.
Figure 10:
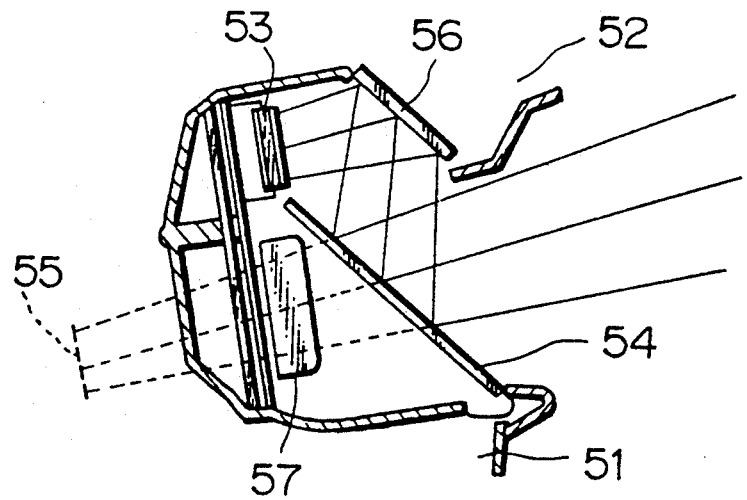

For example, as in the prism reflector 2' of FIG. 8, the flange portion 22' may not be formed at a ridgeline where two major surfaces of the prism 21' adjoin at an acute angle. This offers an advantage that the grinding of the second surface 21B' of the prism 21' becomes easier during the manufacture of the prism reflector 2'.

The construction and advantages of the automotive reflection type display apparatus of this invention may be summarized as follows. A reflecting member that provides a reflecting surface consists of a prism and flat plate-like flange portion which is flush with a first surface of two major surfaces of the prism adjoining at an acute angle and which extends from the circumference of the first surface. By using the reflecting member, the light from display of the indicator is transmitted through the prism of the reflecting member toward the concave surface of the reflector plate opposing the reflecting member. The light of the display is then reflected by the concave surface back toward the reflecting surface of the reflecting member. The light is further reflected by the reflecting surface of the reflecting member toward the driver's seat. This construction makes effective use of the space between the reflecting member and the reflector plate to provide a long path of light, elongating the distance from the driver's viewing point to the virtual display image formed at a remote position behind the reflecting member, while at the same time making the whole apparatus compact. Since the virtual display image is enlarged by the concave surface, the viewing angle of the image is increased. Furthermore, the flange portion of the reflecting member increases the viewing area on the reflecting surface.

What is claimed is:

1. An automotive reflection type display apparatus comprising:
   a reflecting member forming a reflecting surface, said reflecting member including a prism having first and second major surfaces adjoining at an acute angle and a flat plate-like flange portion on said prism, said flat plate-like portion being flush with said first major surface of the prism, said flat plate-like flange portion extending from a circumference of said first major surface;
   an indicator disposed to have a display surface facing said second major surface of the prism of the reflecting member that adjoins the first surface at said acute angle; and
   a reflector plate having a reflecting concave surface that opposes the reflecting surface of the reflecting member, said reflector plate being disposed in such a way that a light axis of the reflecting concave surface extending toward the reflecting surface of the reflecting member is inclined toward a thicker side of the prism and the reflector plate is disposed so that the display surface of the indicator is located within a focal point of the reflecting concave surface;
   wherein the reflecting member, the indicator and the reflector plate are arranged so that the light axis of the reflecting concave surface of the reflector plate extends optically through the reflecting surface of the reflecting member toward a driver's seat, rays of light from a display of the indicator are transmitted through the prism of the reflecting member, reflected by the concave surface of the reflector plate back toward the reflecting surface of the reflecting member and then further reflected by the reflecting surface toward the driver's seat so that a virtual image of the indicator display can be seen through and within the reflecting surface from the driver's seat side.

2. An automotive reflection type display apparatus as claimed in claim 1, wherein a dark coating is applied to the reflecting member over a surface of the prism other than said first and second major surfaces adjoining at said acute angle and over a back of the flat plate-like flange portion opposite to the reflecting surface.

3. An automotive reflection type display apparatus as claimed in claim 1, wherein additional indicators are provided close to the reflecting surface of the reflecting member in such a way that light from additional indicators' display is reflected by a peripheral portion of the reflecting surface, therein giving a combined display of the display of the first indicator and the display of the additional indicators.

4. An automotive reflection type display apparatus as claimed in claim 1, wherein said reflecting surface of the reflecting member is formed with openings at peripheral portions to accommodate additional indicators so that a combined display of the display of the first indicator and the display of the additional indicators can be shown on the reflecting surface of the reflecting member.

* * * * *